(12) United States Patent
Sussland et al.

(10) Patent No.: US 7,971,234 B1
(45) Date of Patent: Jun. 28, 2011

(54) METHOD AND APPARATUS FOR OFFLINE CRYPTOGRAPHIC KEY ESTABLISHMENT

(75) Inventors: Robert Sussland, Redwood City, CA (US); Lawrence Chang, Redwood City, CA (US); Ananthan Subramanian, Redwood City, CA (US); Joshua Silberman, Redwood City, CA (US)

(73) Assignee: NetApp, Inc., Sunnyvale, CA (US)

( * ) Notice: Subject to any disclaimer, the term of this patent is extended or adjusted under 35 U.S.C. 154(b) by 970 days.

(21) Appl. No.: 11/532,468

(22) Filed: Sep. 15, 2006

(51) Int. Cl.
G06F 15/16 (2006.01)
(52) U.S. Cl. ................................. 726/5; 726/7; 713/168
(58) Field of Classification Search .................. 726/5, 7; 713/168
See application file for complete search history.

(56) References Cited

U.S. PATENT DOCUMENTS

| | | |
|---|---|---|
| 1,310,719 A | 7/1919 | Vernam |
| 4,262,329 A | 4/1981 | Bright et al. |
| 4,558,176 A | 12/1985 | Arnold et al. |
| 4,757,533 A | 7/1988 | Allen et al. |
| 5,185,717 A | 2/1993 | Mori |
| 5,235,641 A | 8/1993 | Nozawa |
| 5,265,159 A | 11/1993 | Kung |
| 5,677,952 A | 10/1997 | Blakley, III et al. |
| 5,687,237 A | 11/1997 | Naclerio |
| 5,870,468 A | 2/1999 | Harrison |
| 5,931,947 A | 8/1999 | Burns |
| 5,933,498 A | 8/1999 | Schneck et al. |
| 5,940,507 A | 8/1999 | Cane |
| 6,073,237 A | 6/2000 | Ellison |
| 6,134,660 A | 10/2000 | Boneh et al. |
| 6,212,600 B1 | 4/2001 | Friedman et al. |
| 6,249,866 B1 | 6/2001 | Brundrett |
| 6,345,101 B1 | 2/2002 | Shukla |
| 6,356,941 B1 | 3/2002 | Cohen |
| 6,405,315 B1 | 6/2002 | Burns et al. |
| 6,414,884 B1 | 7/2002 | DeFelice et al. |
| 6,507,911 B1 | 1/2003 | Langford |
| 6,550,011 B1 | 4/2003 | Sims, III |
| 6,625,734 B1 | 9/2003 | Marvit et al. |
| 6,735,693 B1 | 5/2004 | Hamlin |
| 6,754,827 B1 | 6/2004 | Cane et al. |
| 6,839,437 B1 | 1/2005 | Crane et al. |
| 6,857,076 B1 | 2/2005 | Klein |
| 6,915,435 B1 | 7/2005 | Merriam |

(Continued)

OTHER PUBLICATIONS

Anderson et al., "The Steganographic File System," Information Hiding, Second International Workshop, IH '98 Portland, Oregon. USA, Apr. 14-17, 1998, Proceedings, pp. 73-82, 1998.

(Continued)

Primary Examiner — Jason K Gee
(74) Attorney, Agent, or Firm — Cesari and McKenna, LLP

(57) ABSTRACT

The invention provides an authentication scheme that allows networked devices to establish trust in connection with the exchange of keys pursuant to an asymmetrical cryptographic technique, such as Diffie-Hellman. The invention provides a technique, referred to as offline key establishment, that establishes a trust relationship between two networked devices that use Diffie-Helman. Offline key sharing provides for the exchange of authentication information using a separate channel which, in the preferred embodiment does not constitute an IP connection. Thus, while communications between networked devices may ultimately proceed via a network connection, trust between the networked devices is established via a separate, offline channel, such as a telephone call or email message. The use of offline key establishment allows for such features as one way key sharing; and addresses situations where one party to the exchange does not want to share all of his keys, but just one or two keys.

8 Claims, 9 Drawing Sheets

U.S. PATENT DOCUMENTS

| | | | |
|---|---|---|---|
| 6,993,661 B1 | 1/2006 | Garfinkel | |
| 7,003,674 B1 | 2/2006 | Hamlin | |
| 7,020,779 B1 | 3/2006 | Sutherland | |
| 7,093,127 B2 | 8/2006 | McNulty et al. | |
| 7,096,355 B1 | 8/2006 | Marvit et al. | |
| 7,215,771 B1 | 5/2007 | Hamlin | |
| 7,240,197 B1 | 7/2007 | Yamagami et al. | |
| 7,260,724 B1 | 8/2007 | Dickinson et al. | |
| 2002/0019935 A1* | 2/2002 | Andrew et al. | 713/165 |
| 2003/0028765 A1 | 2/2003 | Cromer et al. | |
| 2004/0030668 A1 | 2/2004 | Pawlowski et al. | |
| 2004/0073795 A1* | 4/2004 | Jablon | 713/171 |
| 2006/0090067 A1* | 4/2006 | Edmonds et al. | 713/159 |

OTHER PUBLICATIONS

Antonelli, et al., "The Packet Vault: Secure Storage of Network Data," CITI Technical Report 98-5, pp. 1-15, Jun. 25, 1998.

Blaze, "Oblivious Key Escrow," Information Hiding, First International Workshop, Cambridge, UK, May 3D-Jun. 1, 1996, Proceedings, pp. 335-343, 1996.

Blaze, "A cryptographic File System for Unix," Proceedings of the First ACM Conference on Computer and Communications Security, pp. 9-16 (1993).

Blaze, "Key Management in an Encrypting File System," USENIX Summer 1994 Technical Conference, pp. 27-35, (Jun. 6-10, 1994).

Boneh, et al., "A Revocable Backup System," In Proceedings 6th USENIX Security Conference, pp. 91-96, 1996.

Cattaneo, et al. "The Design and Implementation of a Transparent Cryptographic Filesystem for UNIX," Proceedings of The FREENIX Track: 2001 UNIX Annual Technical Conference. pp. 199-212 (Jun. 25-30, 2001).

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology—Eurocrypt '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing. Proceedings of the Northeast ACM Symposium on Personal Computer Security, pp. 38-45 (1986).

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes," IBM Technical Disclosure Bulletin, pp. 444-445, Feb. 1991.

"Disappearing Inc. Makes Old Email Vanish Everywhere; Reduces Corporate Liability as well as Improves Corporate Productivity by Enabling Sensitive Communications via Email-Company Business and Marketing," Edge: Work-Group Computing Report, http://findarticles.com/p/articJes/mLmOWUB/is_1999_0cU 1/aL 56260487/print (Oct. 11, 1999).

Double, "Encryption Key Security by Electric Field Destruction of Memory Cells," IBM Technical Disclosure Bulletin, pp. 8-11, Jan. 1989.

FIPS Pub 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

FIPS Pub 140-1, "Security Requirements for Cryptographic Modules," Federal Information Processing Standards Publication 140-1, National Institute of Standards and Technology, Jan. 11, 1994, 44 pages.

Flavin, et al., "Data Protection on Magnetic Media Via an Encrypting Controller," IBM Technical Disclosure Bulletin, vol. 3D, No. 3, pp. 1284-1285 (Aug. 1987).

Garfinkel, S., "PGP: Pretty Good Privacy," O'Reilly & Associates, pp. 43 and 65-67, Jan. 1995.

Garfinkel, S., "PGP: Pretty Good Privacy," O'Reilly & Associates, pp. 54-55, 151-153, Jan. 1995.

Garfinkel, S., "Omniva's Self-Destructing Email," Web Security, Privacy and Commerce, Second Edition, O'Reilly & Associates, Inc., Sebastopol, CA, pp. 280-283, Jan. 2002.

Gobioff, Howard, et al., "Security for Networked Attached Storage Devices," Carnegie Mellon University Computer Science Technical Report CMU-CS-97-185, Oct. 1997, 20 pages.

Gobioff, Howard, "Security for a High Performance Commodity Storage Subsystem," Carnegie Mellon University Computer Science Technical Report CMU-CS-99-160, Jul. 1999, 222 pages.

Gobioff, Howard, et al., "Smart Cards in Hostile Environments," Proceedings of the Second USENIX Workshop on Electronic Commerce, pp. 23-28 (Nov. 18-21. 1996).

Graham, et al, "Data Protection at the Volume Level," IBM Technical Disclosure Bulletin, pp. 146-148, Oct. 1988.

Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25, 1996).

Hwang, et al., "An Access Control Scheme Based On Chinese Remainder Theorem and Time Stamp Concept," Computers & Security, vol. 15. No. 1. pp. 73-81, 1996.

IBM Crypto Server Management General Information Manual, First Edition (May 2000), 16 pages.

IBM SecureWay Cryptographic Products IBM 4758 PCI Cryptographic Coprocessor Installation Manual, Security Solutions and Technology Department, Second Edition (Mar. 2000), 34 pages.

IBM Integrated Cryptographic Coprocessors for IBM eServer zSeries 900 and for IBM S/390 Servers (Data sheet), 2000, 4 pages.

IBM SecureWay, UltraCypher Cryptographic Engine (Datasheet) (1998), 2 pages.

IBM 4758 PCI Cryptographic Coprocessor Custom Software Installation Manual, Second Edition, Jan. 2001, 30 pages.

Avoid Litigation: Encrypt Your Data, InfoTech Research Group, Sep. 19, 2006, 6 pages.

Johnson et al., "Self-Destructing Diskette," IBM Technical Disclosure Bulletin, vol. 33, No. 1A, pp. 218-219 (Jun. 1990).

Mallett, "Considerations for Applying Disk Encryptors 10 Environments Subject to Hostile Overrun," IEEE, pp. 218-222, 1991.

Mauriello, "TCFS: Transparent Cryptographic File system," LINUX Journal, Aug. 1, 1997, 8 pages.

Menezes et al., "Handbook of Applied Cryptography," CRC Press, Section 13.7.1, 4 pages, 1997.

Moore, "Preventing Access to A Personal Computer," IBM Technical Disclosure Bulletin, pp. 98-100, Sep. 1992.

Omniva Policy Systems, www.omniva.com, (Aug. 2004), downloaded from web.archive.org on Aug. 24, 2004, 19 pages.

Provos, Niels, "Encrypting Virtual Memory," CITI Technical Report 00-3, Center for Information Technology Integration, University of Michigan, Apr. 25, 2000, 11 pages.

Scherzer. "Memory Protection in Chip Cards," IBM Technical Disclosure Bulletin, pp. 416-417, Oct. 1989.

Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.

Slusarczuk et al., "Emergency Destruction of Information Storage Media," Institute for Defense Analysis, IDA Report R-321, Dec. 1987, 196 pages.

Smith, "Verifying Type and Configuration of an IBM 4758 Device: A While Paper," IBM T.J. Watson Research Center pp. 1-7 (218/00).

Smith et al., "IBM Research Report: Building a High-Performance, Programmable Secure Coprocessor," IBM Research Division, Computer Science/Mathematics, RC 21102(94393) (Feb. 19, 1998), 61 pages.

Stinson, Douglas R., "Cryptography: Theory and Practice," CRC Press, Mar. 1, 1995, 228 pages.

Vernam, "Cipher Printing Telegraph Systems for Secret Wire and Radio Telegraphic Communications," Journal of the Al EE. pp. 109-115, Feb. 1926.

Weingart, "Physical Security for the μABYSS System," Proceedings 1987 IEEE Symposium on Security and Privacy, pp. 2-58 (Apr. 27-29, 1987), pp. 52-58.

Whitten et al., "Usability of Security: A Case Study," CMU Computer Science Technical Report CMU-CS-98-155. pp. 1-39, Dec. 18, 1998.

Yee et al., "Secure Coprocessors in Electronic Commerce Applications," Proceedings of the First USENIX Workshop of Electronic Commerce, pp. 155-170, Jul. 11-12, 1995.

Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).

Zadok et al., "Cryptfs: A Stackable Vnode Level Encryption File System," Computer Science Department, Columbia University, CUCS-021-98, pp. 1-14, Jun. 1998.

* cited by examiner

METHOD AND APPARATUS FOR OFFLINE CRYPTOGRAPHIC KEY ESTABLISHMENT

BACKGROUND OF THE INVENTION

1. Technical Field

The invention relates to cryptography. More particularly, the invention relates to a method and apparatus for offline cryptographic key establishment.

2. Description of the Prior Art

The Diffie-Hellman key agreement protocol (also called exponential key agreement) was developed by Diffie and Hellman [W. Diffie and M. E. Hellman, New directions in cryptography, *IEEE Transactions on Information Theory* 22 (1976), 644-654] in 1976 and published in the paper "New Directions in Cryptography." The protocol allows two users to exchange a secret key over an insecure medium without having previously exchanged secrets. The protocol has two system parameters p and g. They are both public and may be used by all the users in a system. Parameter p is a prime number and parameter g (usually called a generator) is an integer less than p, with the following property:

for every number n between 1 and p−1 inclusive, there is a power k of g such that n=$g^k$ mod p.

Suppose Alice and Bob want to agree on a shared secret key using the Diffie-Hellman key agreement protocol. They proceed as follows:

First, Alice generates a random private value a and Bob generates a random private value b. Both, a and b are drawn from the set of integers. Then they derive their public values using both parameters p and g and their private values a and b. Alice's public value is $g^a$ mod p and Bob's public value is $g^b$ mod p. They then exchange their public values. Finally, Alice computes $g^{ab}=(g^b)^a$ mod p, and Bob computes $g^{ba}=(g^a)^b$ mod p. Because $g^{ab}=g^{ba}=k$, Alice and Bob now have a shared secret key k.

The protocol depends on the discrete logarithm problem for its security. It assumes that it is computationally infeasible to calculate the shared secret key k=$g^{ab}$ mod p given the two public values $g^a$ mod p and $g^b$ mod p when the prime p is sufficiently large. Maurer [U. Maurer, Towards the equivalence of breaking the Diffie-Hellman protocol and computing discrete logarithms, Advances in Cryptology—Crypto '94, Springer-Verlag (1994), 271-281] has shown that breaking the Diffie-Hellman protocol is equivalent to computing discrete logarithms under certain assumptions.

The Diffie-Hellman key exchange is vulnerable to a man-in-the-middle attack. In this attack, an opponent Carol intercepts Alice's public value and sends her own public value to Bob. When Bob transmits his public value, Carol substitutes it with her own and sends it to Alice. Carol and Alice thus agree on one shared key and Carol and Bob agree on another shared key. After this exchange, Carol simply decrypts any messages sent out by Alice or Bob, and then reads and possibly modifies them before re-encrypting with the appropriate key and transmitting them to the other party. This vulnerability is present because Diffie-Hellman key exchange does not authenticate the participants.

Known solutions include the use of digital signatures and other protocol variants. The authenticated Diffie-Hellman key agreement protocol, or Station-to-Station (STS) protocol, was developed by Diffie, van Oorschot, and Wiener in 1992 [W. Diffie, P. C. van Oorschot, and M. J. Wiener, Authentication and authenticated key exchanges, *Designs, Codes and Cryptography* 2 (1992), 107-125] to defeat the man-in-the-middle attack on the Diffie-Hellman key agreement protocol. The immunity is achieved by allowing the two parties to authenticate themselves to each other by the use of digital signatures and public-key certificates.

Roughly speaking, the basic idea is as follows:

Prior to execution of the protocol, the two parties Alice and Bob each obtain a public/private key pair and a certificate for the public key. During the protocol, Alice computes a signature on certain messages, covering the public value $g^a$ mod p. Bob proceeds in a similar way. Even though Carol is still able to intercept messages between Alice and Bob, she cannot forge signatures without Alice's private key and Bob's private key. Hence, the enhanced protocol defeats the man-in-the-middle attack. In this scenario, Alice and Bob know each other and have no need to authenticate each other's identity.

Authentication is any process through which one proves and verifies certain information. Sometimes one may want to verify the origin of a document, the identity of the sender, the time and date a document was sent and/or signed, the identity of a computer or user, and so on.

A digital signature is a cryptographic means through which many of these may be verified. The digital signature of a document is a piece of information based on both the document and the signer's private key. It is typically created through the use of a hash function and a private signing function (encrypting with the signer's private key), but there are other methods.

Every day, people sign their names to letters, credit card receipts, and other documents, demonstrating they are in agreement with the contents. That is, they authenticate that they are in fact the sender or originator of the item. This allows others to verify that a particular message did indeed originate from the signer. However, this is not foolproof because people can lift signatures off one document and place them on another, thereby creating fraudulent documents. Written signatures are also vulnerable to forgery because it is possible to reproduce a signature on other documents as well as to alter documents after they have been signed.

Digital signatures and hand-written signatures both rely on the fact that it is very hard to find two people with the same signature. People use public-key cryptography to compute digital signatures by associating something unique with each person. When public-key cryptography is used to encrypt a message, the sender encrypts the message with the public key of the intended recipient. When public-key cryptography is used to calculate a digital signature, the sender encrypts the digital fingerprint of the document with his own private key. Anyone with access to the public key of the signer may verify the signature.

Suppose Alice wants to send a signed document or message to Bob. The first step is generally to apply a hash function to the message, creating what is called a message digest. The message digest is usually considerably shorter than the original message. In fact, the job of the hash function is to take a message of arbitrary length and shrink it down to a fixed length. To create a digital signature, one usually signs (encrypts) the message digest as opposed to the message itself. This saves a considerable amount of time, though it does create a slight insecurity. Alice sends Bob the encrypted message digest and the message, which she may or may not encrypt. For Bob to authenticate the signature he must apply the same hash function as Alice to the message she sent him, decrypt the encrypted message digest using Alice's public key and compare the two. If the two are the same he has successfully authenticated the signature. If the two do not match there are a few possible explanations. Either someone is trying to impersonate Alice, the message itself has been altered since Alice signed it, or an error occurred during transmission Certificates are digital documents attesting to the binding of a public key to an individual or other entity. They allow verification of the claim that a specific public key does in fact belong to a specific individual. Certificates help prevent someone from using a phony key to impersonate someone else. In some cases it may be necessary to create a chain of certificates, each one certifying the previous one until the parties involved are confident in the identity in question.

In their simplest form, certificates contain a public key and a name. As commonly used, a certificate also contains an expiration date, the name of the certifying authority that issued the certificate, a serial number, and perhaps other information. Most importantly, it contains the digital signature of the certificate issuer. The most widely accepted format for certificates is defined by the ITU-T X.509 international standard; thus, certificates can be read or written by any application complying with X.509.

While the use of asymmetrical encryption schemes, such as Diffie-Hellman, in concert with various authentication schemes, such as the use of digital signatures and certificates is known, it is not currently known how to share keys between networked devices that do not communicate directly with one another. For example, network storage devices may exchange encrypted information on the basis of asymmetrical cryptographic techniques, such as the use of Diffie-Hellman. However, such devices may be initially unknown to each other and, therefore, lack sufficient trust to exchange such information over an insecure medium. It would be advantageous to provide an authentication scheme that allowed such networked devices to establish trust in connection with the exchange of keys pursuant to an asymmetrical cryptographic technique, such as Diffie-Hellman.

SUMMARY OF THE INVENTION

The invention provides an authentication scheme that allows networked devices to establish trust in connection with the exchange of keys pursuant to an asymmetrical cryptographic technique, such as Diffie-Hellman. The invention provides a technique, referred to as offline key establishment, that establishes a trust relationship between two networked devices that use an asymmetrical encryption scheme, such as Diffie-Helman. Offline key sharing provides for the exchange of authentication information using a separate channel which, in the preferred embodiment does not constitute an IP, or network, connection. Thus, while communications between networked devices may ultimately proceed via a network connection, trust between the networked devices is established via a separate, offline channel, such as a telephone call or email message. The use of offline key establishment allows for such features as one way key sharing; and addresses situations where one party to the exchange does not want to share all of his keys, but just one or two keys.

DETAILED DESCRIPTION OF THE INVENTION

Figure 1:
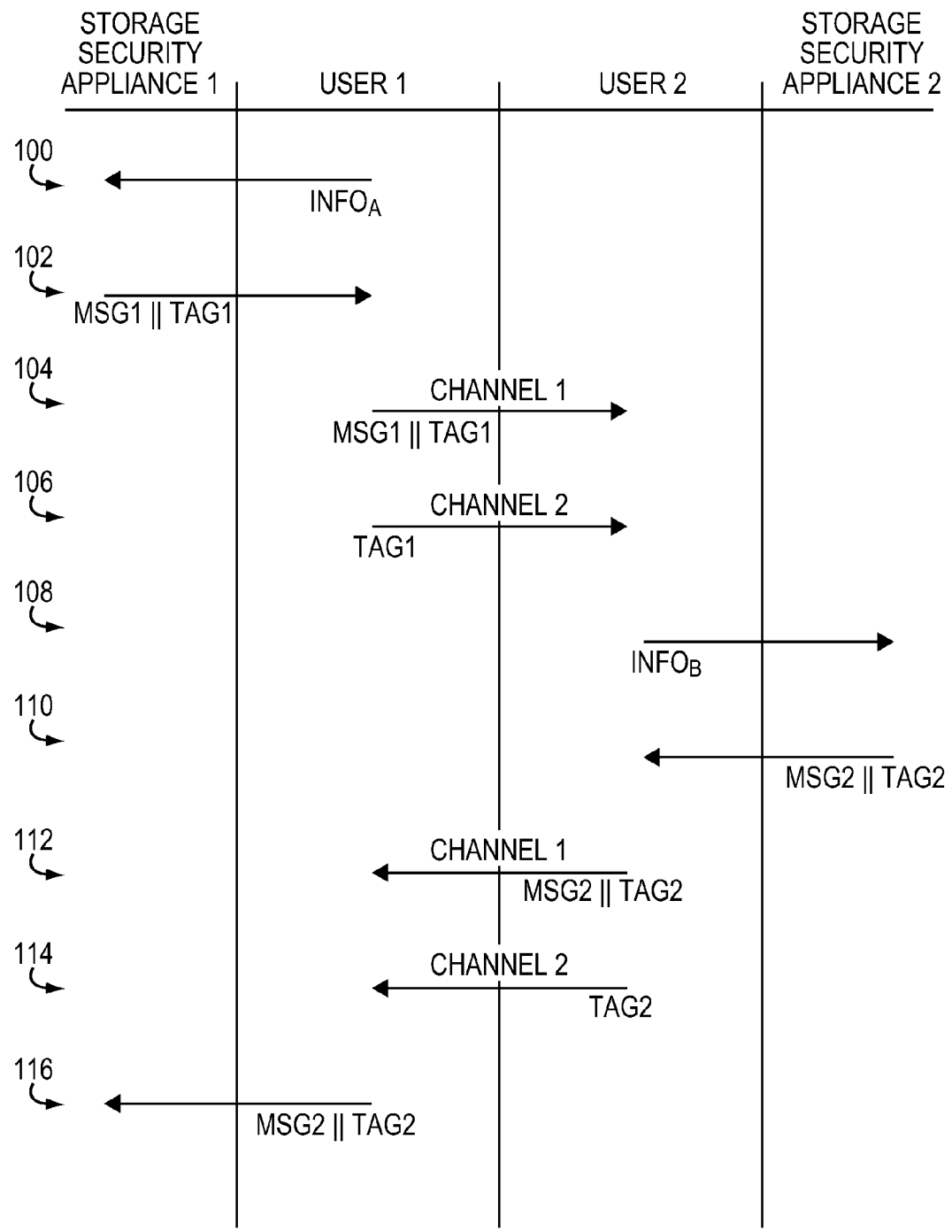
FIG. 1 is a flow diagram showing the establishment of a trust relationship between two storage security appliances according to the invention.

The invention provides an authentication scheme that allows networked devices to establish trust in connection with the exchange of keys pursuant to an asymmetrical cryptographic technique, such as Diffie-Hellman. Although the invention is described herein in connection with Diffie-Hellman, those skilled in the art will appreciate that other asymmetric encryption schemes may be used in connection with the invention.

The invention provides a technique, referred to as offline key establishment, that establishes a trust relationship between two networked devices that use Diffie-Helman. Offline key sharing provides for the exchange of authentication information using a separate channel which, in the preferred embodiment does not constitute an IP, or network, connection. Thus, while communications between networked devices may ultimately proceed via a network connection, trust between the networked devices is established via a separate, offline channel, such as a telephone call or email message. The use of offline key establishment allows for such features as one way key sharing; and addresses situations where one party to the exchange does not want to share all of his keys, but just one or two keys.

The presently preferred embodiment of the invention operates in connection with a storage security appliance. One example of such device is the Decru DataFort™ manufactured by Network Appliance (Sunnyvale, Calif.). A storage security appliance encrypts network data in transit to storage, providing authentication, fine grain access controls, and secure logging in the process. Storage security appliances support the creation of secured storage targets in which encrypted data are stored. Data remains encrypted while stored in such secured storage targets, protected from unauthorized access. When data are requested by an authorized host, the storage security appliance decrypts it, then forwards it to the appropriate network destination. A typical storage security appliance can provide managed, encrypted network storage for NAS, SAN, and IP networks.

When installed between hosts and storage, the storage security appliance encrypts data en route to storage devices and decrypts data as it is read from storage by hosts, without impact on the existing network structure. The storage security appliance also supports legacy cleartext tapes, ensuring a seamless transition to a secure environment. Standard installation places storage security appliances in a clustered configuration on a single network, providing automatic failover protection, with all encryption key and access control information shared securely between the cluster members. The storage security appliance administrator has direct access to essential network setup and maintenance tasks by means of the web-based management interface, other graphical user interface (GUI), command line interface (CLI), or the like. In a typical installation, all key security administration tasks, including those needed to manage all members of a storage security appliance cluster, can be accessed using this tool from a single workstation.

A trustee is a remote storage security appliance with which a trust relationship has been formed, allowing exportable encryption keys to be shared. Creating trustees allows secured storage target, tape, and pool keys to be shared between storage security appliances that have no recovery cards in common, and may not even be on the same network. A trustee may import keys from or export keys to another trustee. Imported keys cannot be exported once they are imported. Pursuant to the invention herein, trustees send messages to establish a trustee relationship before key sharing. The first message in setting up a trustee relationship is referred to herein as the trustee establishment package (TEP). The second message, a response to a TEP, is referred to herein as the trustee acceptance package (TAP). The result of the trust establishment operation is a link key, known to both parties. Once trustee setup is complete, encryption keys may be shared via this link key. Note that unlike online trust establishment operations, which negotiate a session key, the link key is a key that wraps data to be stored outside of a session, because the encrypted keys must be transported to a recipient via an offline manner. Recovery cards are only required during trustee setup.

FIG. 1 is a flow diagram showing the establishment of a trust relationship between two storage security applications in accordance with the invention. Those skilled in the art will appreciate that this technique is readily applicable to any network devices that are to be authenticated before the exchange of cryptographic keys takes place. Authentication in this example proceeds as follows:

Step 1. User 1 inputs Info A into storage security appliance1. Thus, the storage security appliance 1 generates a public/private key pair (100).

Step 2. The storage security appliance 1 returns an initiator message, i.e. Msg1: ID||InfoA||PubKeyA (102).

Step 3. User1 communicates Msg1 to User2 via channel 1 (104). User2 confirms the identity of User1. User1 communicates Tag1, i.e. Tag1: e.g. SHA-256(Msg1), to User2 via channel 2, which is an offline channel, such as a telephone call or email message (106).

Step 4. User2 inputs InfoB, Msg1, Tag1 into storage security appliance 2 (108). Storage security appliance 2 generates a public/private key pair and derives key material.

Step 5. The storage security appliance 2 returns Msg2 (Msg2: ID||InfoB||PubKeyB||KeyID), Tag2 (Tag2: SHA-256 (Msg2)) to User2 (110). Msg2 is the initiator response.

Step 6. User2 communicates Msg2,Tag2 to User1 via channel 1 (112).

Step 7. User1 confirms identity of User2. User2 communicates Msg2,Tag2 to User1 via channel 2 (114).

Step 8. User1 inputs Msg2,Tag2 into the storage security appliance 1 (116). The storage security appliance 1 derives key material.

InfoA/InfoB are entered by a user for identification of a particular instantiation of the offline key agreement process (concurrent establishments are possible). ID is generated by storage security appliance 1 and used by the other storage security appliances to identify the instantiation of the process. In the typical storage security appliance product, the ID is also used to identify the establishment process for a separate quorum approval mechanism (required by storage security appliances for completion of the process).

KeyID is used by storage security appliances to identify the key established via the process. Note that KeyID is generated by the storage security appliance 2. Other storage security appliances sign the established key together with KeyID.

Tag1/Tag2 are sent with the initiator messages (channel 1), and are also communicated via channel 2. Comparison between the Tag sent within channel 1 and channel 2 is done by the storage security appliance, not the user.

Note: A middle-man can produce either tag1/tag2, but would not be able to also internally produce the private component of the initiator key pair, corresponding to the public component that is part of the hash.

FIGS. 2-7 provide a series of screen shots which show the steps practiced to perform authentication in accordance with the invention, as discussed above in connection with FIG. 1. It should be appreciated that where a "user" is described as performing a particular action, an appropriate actor can include a software process. Such an exemplary software process can be managed by an operating system of the storage security appliance.

Figure 2:
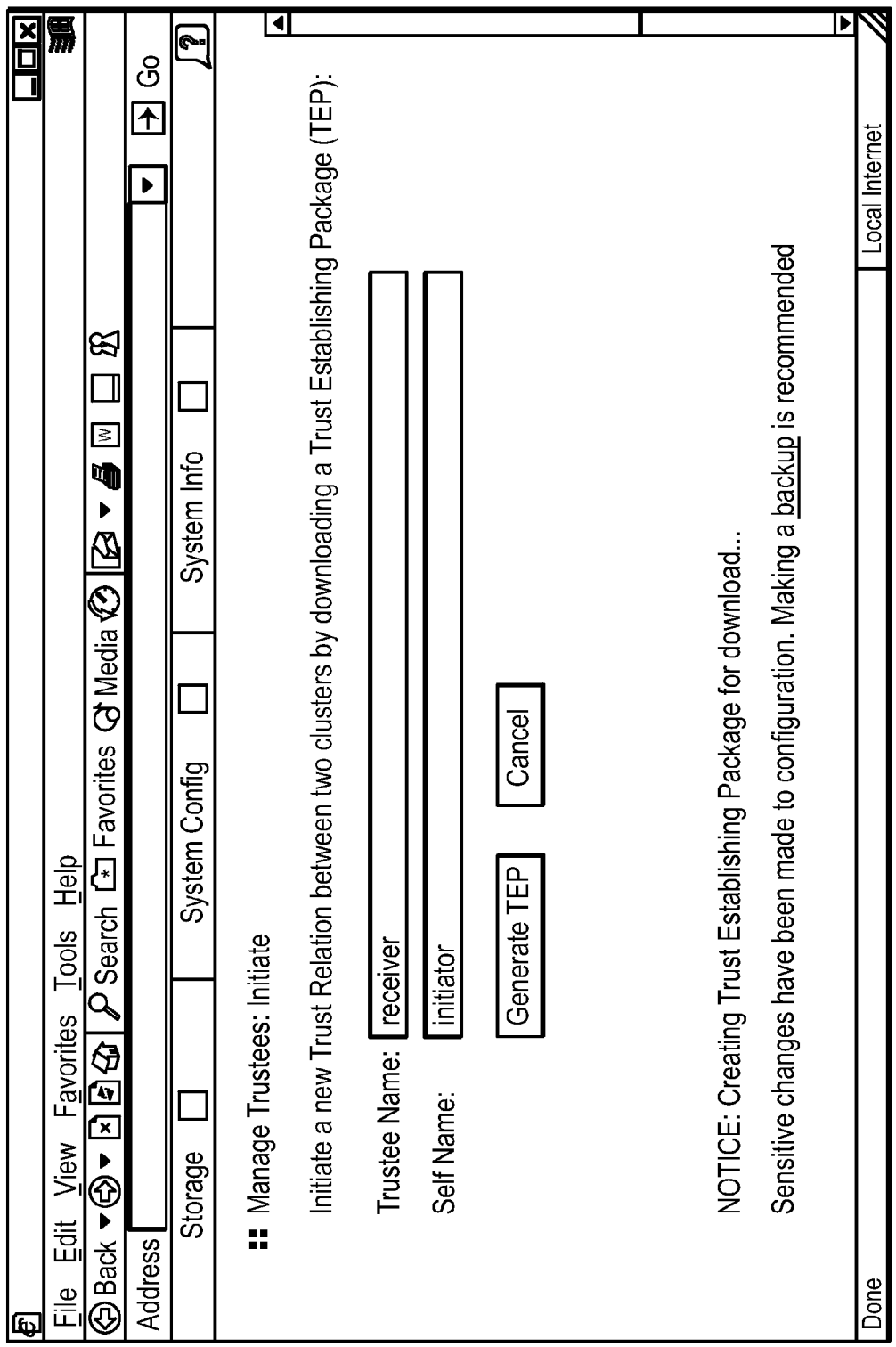
FIGS. 2-7 provide a series of screen shots which show the steps practiced to perform authentication in accordance with the invention, as shown in connection in FIG. 1.

FIG. 2 is a screen shot which shows Step 1 above, in which user 1 enters a self descriptive name (initiator) and the name of a foreign party (receiver).

Figure 3:
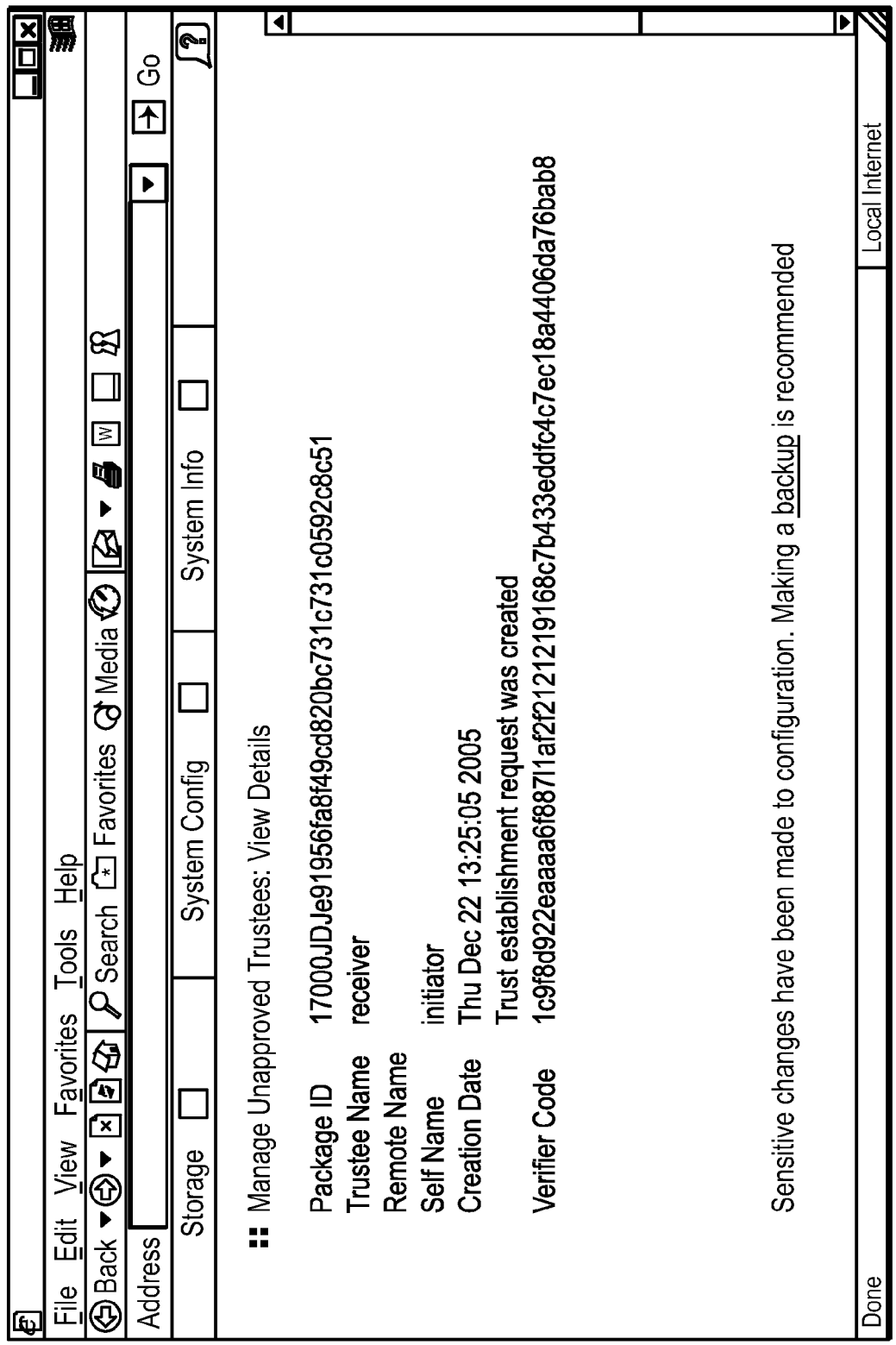

FIG. 3 is a screen shot which shows Step 2 above, in which the trust establishment request of Step 1 is accompanied by a web browser, e.g. Microsoft Internet Explorer or the like, file download (user 1 downloads a storage security appliance 1 generated TEP message).

Figure 4:
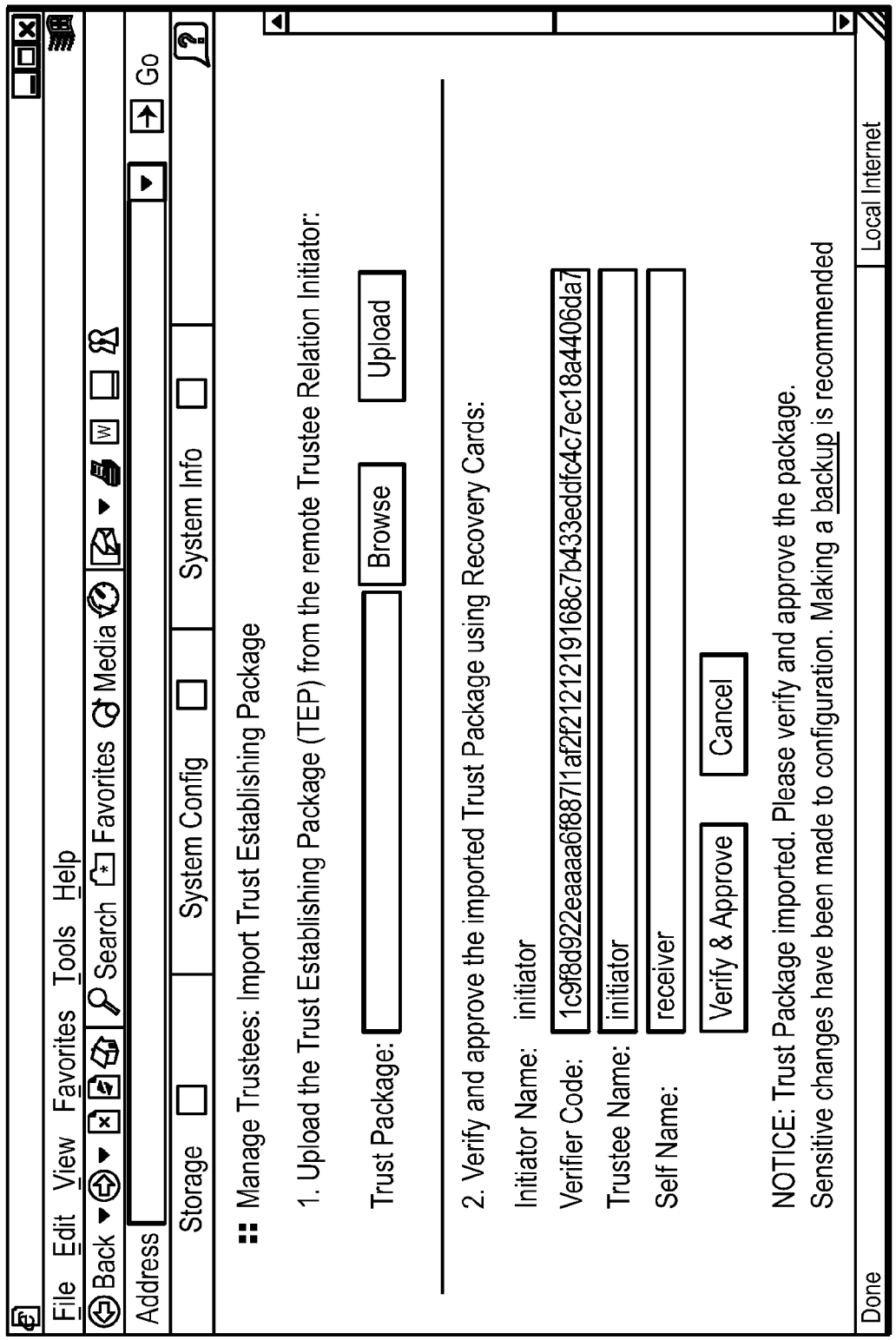

FIG. 4 is a screen shot which shows Steps 3 and 4 above, in which user 1 reads a verifier code from the image of Step 2 (FIG. 3); and user 2 uploads the package from user 1, and enters the verifier code.

Figure 5A:
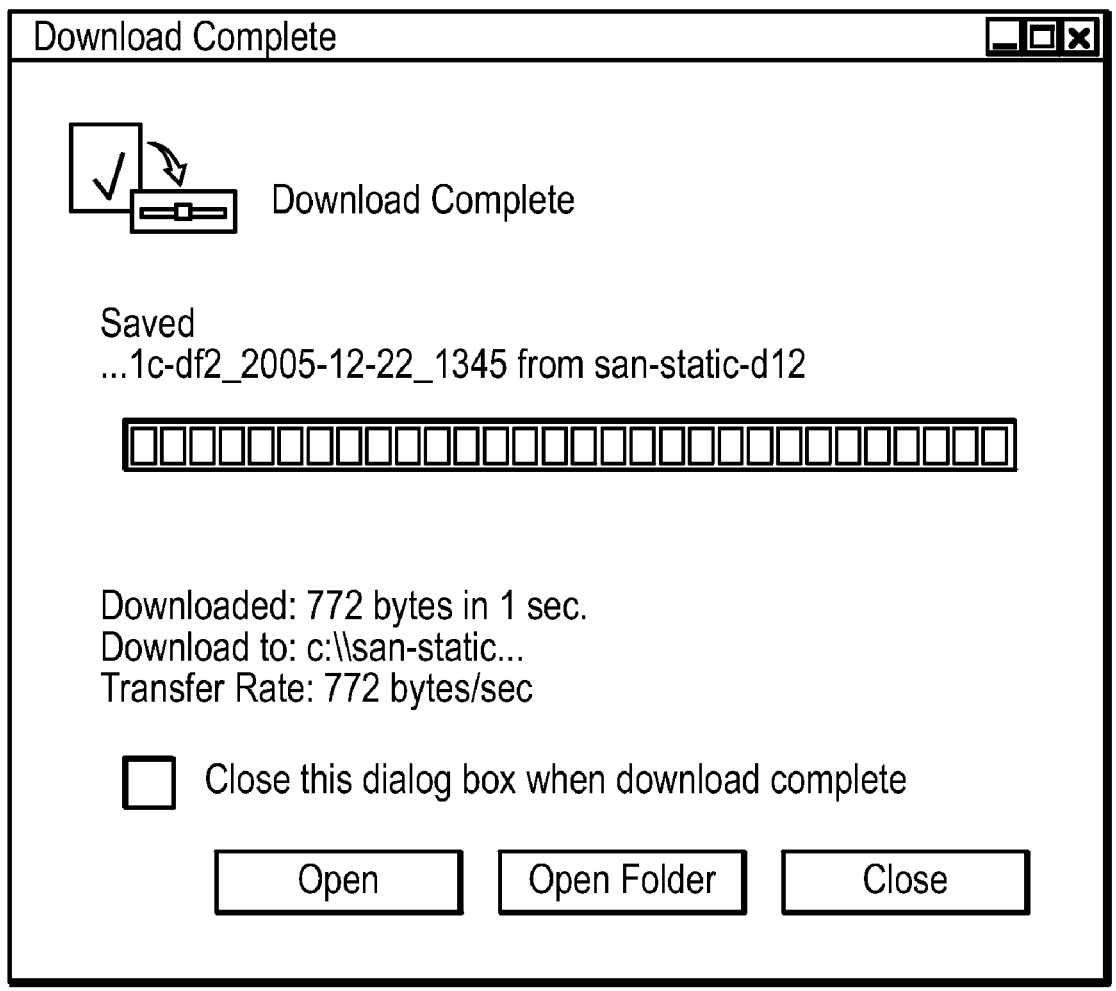
Figure 5B:
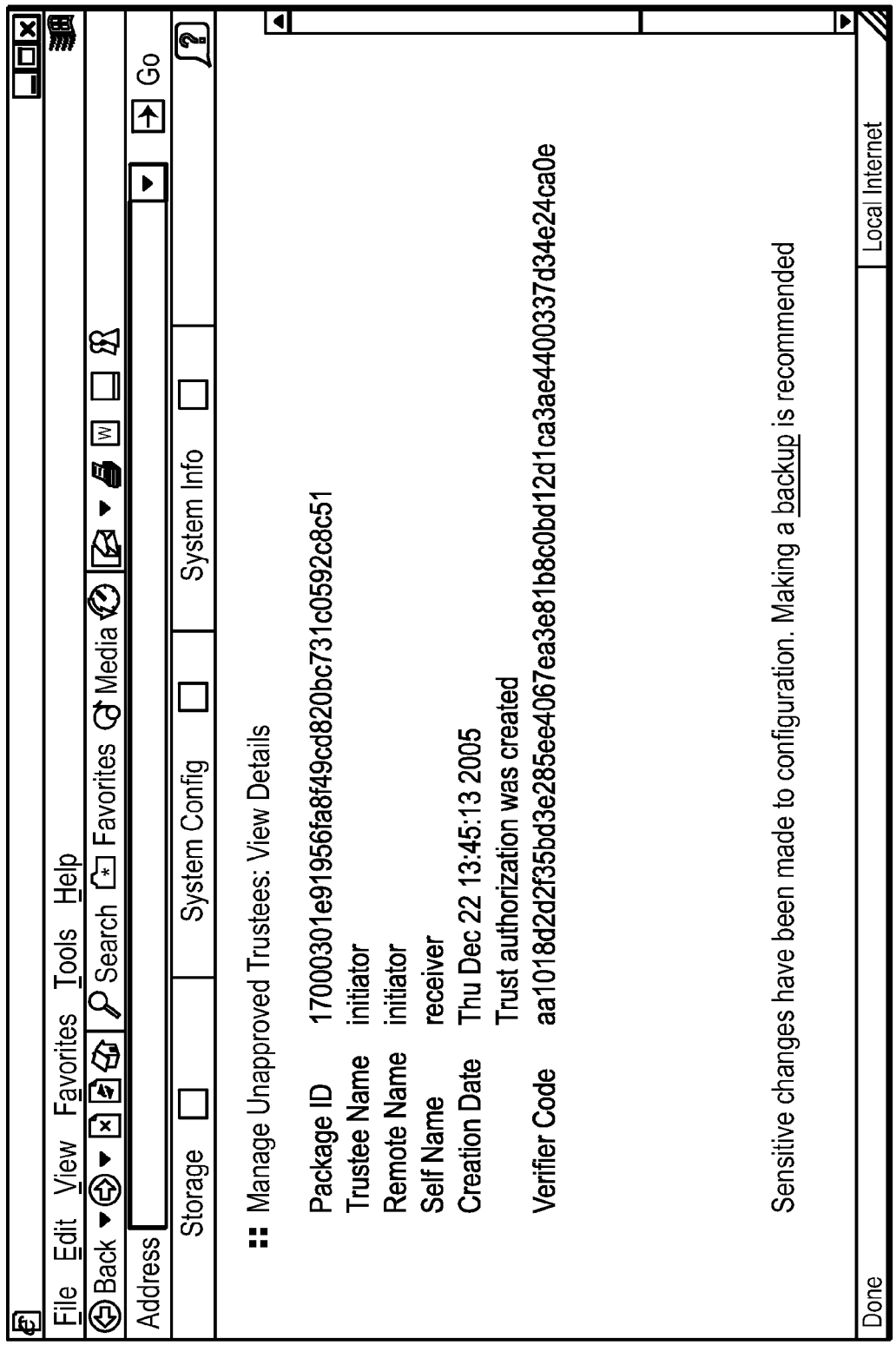

FIGS. 5a and 5b are a screen shots which show Steps 5 and 6 above, in which storage security appliance 2 returns Msg2, Tag2 (Step 5; FIG. 5a); and in which user 2 confirms the verifier code to user 1 via a separate channel, e.g. user 2 reads the verifier code from the screen shown in FIG. 5b to user 1 via a telephone call.

During Step 6 (not shown), user 2 confirms the verifier code to user 1, e.g. user 2 reads the verifier code to user 1 from the screen of Step 5 (FIG. 5a).

As discussed above, during Step 7 user1 confirms the identity of user2, and user2 communicates Msg2, Tag2 to user1 via channel 2.

Figure 6:
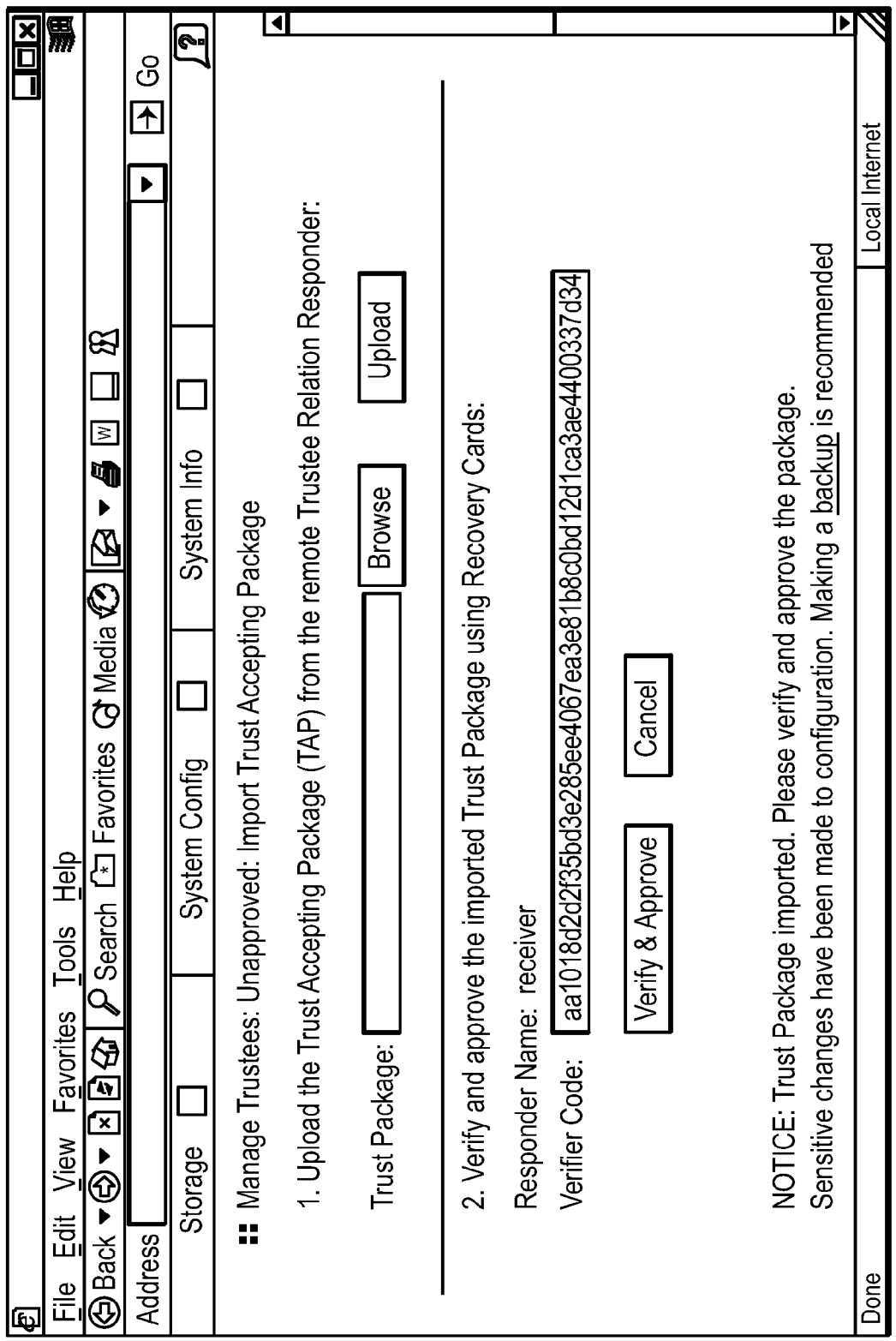

FIG. 6 is a screen shot which shows Step 8 above, in which user 1 uploads Msg2 and enters the verifier code from the storage security appliance of user 2.

Figure 7:
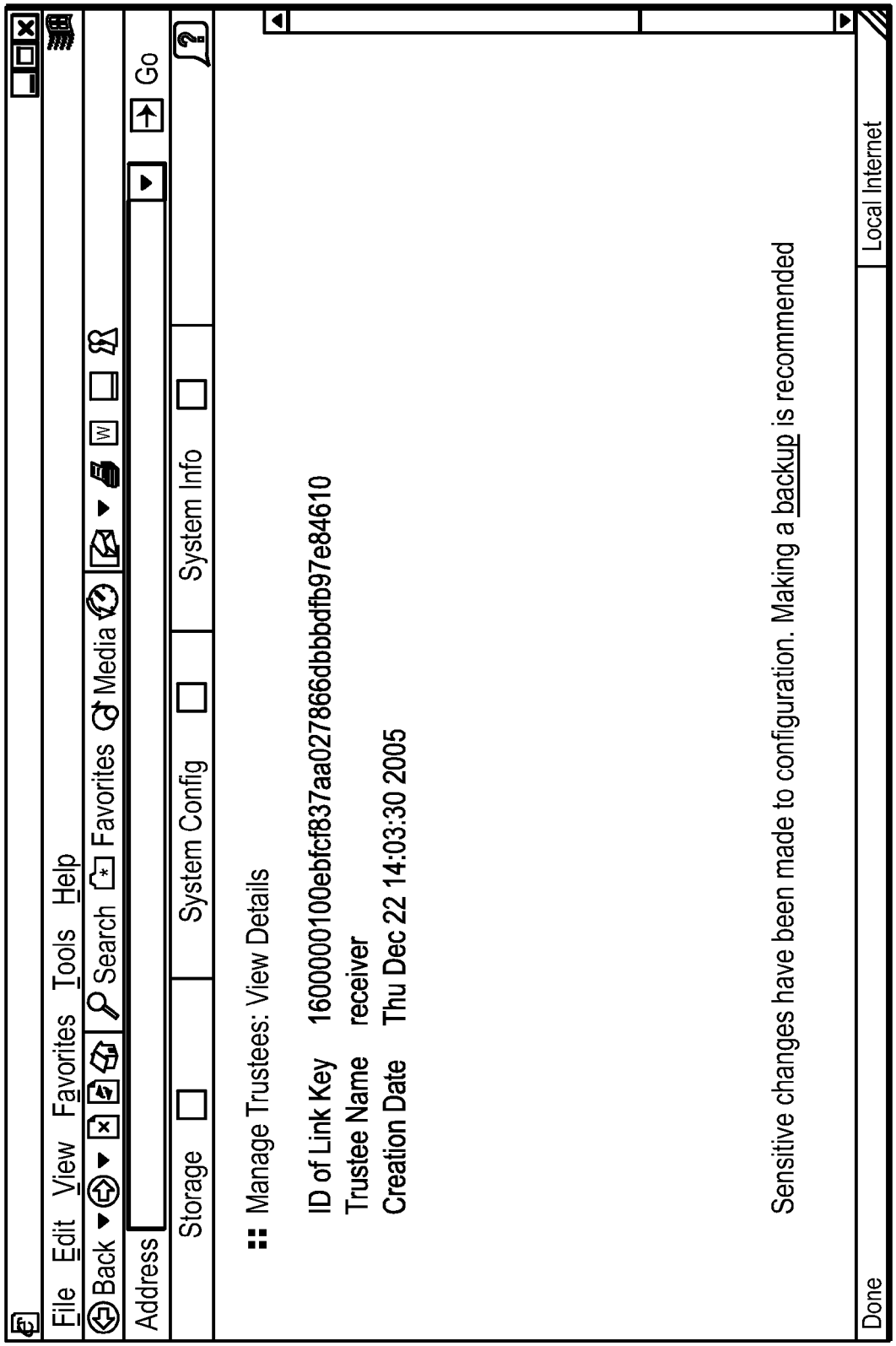

FIG. 7 is screen shot which shows the results as the herein disclosed inventive technique, where both storage security appliances have a link key/common ID. Specifically, FIG. 7 is a view from storage security appliance 1.

Figure 8:
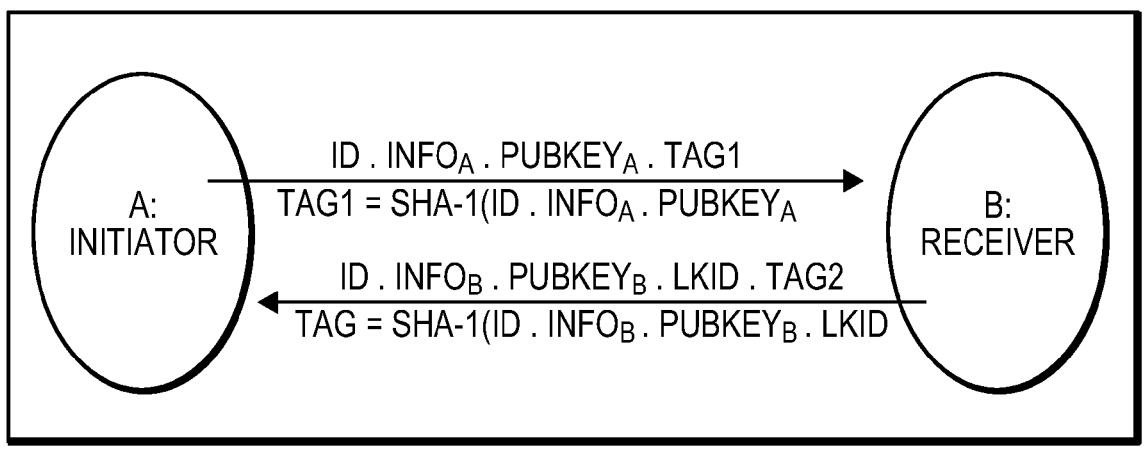
FIG. 8 is a schematic diagram showing the trustee link establishment protocol according to the invention.

FIG. 8 is a schematic diagram showing the trustee link establishment protocol according to the invention. The trustee establishment protocol described above establishes a link key between a local device and a foreign party using a derived ECC shared secret and public shared information as input into a key derivation algorithm, such as the key derivation function (KFD) defined in IEEE standard 1363-2000 or ANSI standard x9-42. The trustee link key protocol runs in an offline fashion and may be run concurrently. It is thus necessary to load and store parameters used by the operation. The operation requires user approval. It is up to the user to verify identity of the foreign party using the offline technique disclosed herein.

Table 1 below shows the inputs, outputs, and parameters associated with the establishment of a trustee link in accordance with the invention. In Table 1, the inputs comprise information describing an initiator and a receiver. The procedure produces as an output generated key that is common to both parties.

TABLE 1

Establish Trustee Link

| | |
|---|---|
| Inputs: | Initiator: |
| | $Info_A$ := operator supplied info field describing the initiator |
| | Receiver: |
| | $Info_B$ := operator supplied info field describing the receiver |
| Output: | The procedure results in a generated key common to both parties |
| Ephemeral Parameters: | TL.ID := ID for this Trust Link Establishment, maintained by both parties. |
| | $TL.privKey_A$ := Private ECC Key for initiator, known only to initiator |
| | $TL.privKey_B$ := Private ECC Key for receiver, known |

TABLE 1-continued

Establish Trustee Link only to receiver
TL.eHash := Hash from Trust Establishment Message The Establish Trustee Link Key protocol is designed to run in an offline fashion. Additionally, the implementation is built to allow for concurrent runs of the protocol. This necessitates the ability to securely load and store the ephemeral parameters used by the operation, including specifically, TLK.tepID, TLK.privKey2, and TLK.ehash . . .

Table 2 below shows an initiator message in accordance with the invention. In Table 2, the input comprises information describing the initiator. The procedure produces as an output a Trust Establishment Message (TEM).

TABLE 2

Initiator: Message 1

| | |
|---|---|
| Inputs: | $Info_A$ := User supplied info field describing the initiator |
| Outputs: | Trust Establishment Message (TEM) |
| | Optionally output ephemeral parameters (wrapped) |
| Procedure: | 1. zeroize all ephemeral parameters [ephemeral] |
| | 2. Construct TL.ID |
| | TL.ID := \|\| PRNG(SW) |
| | 3. Create an ECC-521 key pair |
| | a)(pubKeyA, privKeyA) = generateEccKeyPaireneration (SW) |
| | b)Set TL.privKeyA := privKeyA |
| | 4. Construct and output Trust Establishment Message (TEP) |
| | a)M := TL.ID \|\| $Info_A$ \|\| dhPublicKey \|\| tag |
| | where tag := SHA-256(SW)(TL.ID \|\| $Info_A$ \|\| pubKeyA) |
| | b)Set TL.temHash := tag |
| | c)Output: TEM |
| | 5. Store Private Key externally (optional) |
| | This step may be included to store multiple concurrent trust establishment keys. |
| | Output WrapKey-1(SW)(SEP.DK(TLK), TL.ID \|\| TL.privKeyA \|\| TL.eHash) |

Table 3 below shows a receiver message in accordance with the invention. In Table 3, the inputs comprise the Trust Establishment Message from the initiator and information describing the receiver. The procedure produces as an output a Trust Establishment Accept Message (TAP).

TABLE 3

Receiver: Message 2

| | |
|---|---|
| Inputs: | TEM (Trust establishment message from initiator) |
| | ID \|\| $Info_A$ \|\| pubKeyA \|\| temHash |
| | InfoB := operator supplied info field describing the receiver |
| Outputs: | Trust Establishment Accept Message (TAP) |
| Procedure: | 1. verify hash in TEM |
| | a)SHA-256(SW)(ID \|\| $Info_A$ \|\| pubKeyA) == TEM.temHash |
| | b)after verification, store the ephemeral parameter on receiver side TL.temHash = TEM.temHash |
| | TL.ID = TEM.ID |
| | 2. The receiver module generates and secret shares a nonce associated with TM1.ID. Continuation of the protocol requires recovery of these values. This enforces system user approval of the trust establishment process between the two parties. |
| | a)Verify successful completion of OperationApproval(SW)(TM1.ID) |
| | 3. Create an ECC-521 key pair |
| | a)(pubKeyB, privKeyB) = generateEccKeyPair(SW) |
| | b)Set TL.privKeyB := privKeyB |
| | 4. Create new key ID for the Link Key that will be derived |
| | LK.ID = \|\| PRNG(SW) |
| | 5. Construct and output Trust Accept Message (TAP) |
| | a)M := TL.ID \|\| IB \|\| pubKeyB \|\| LK.ID |
| | b)Compute hash of message |
| | TL.aHash := SHA-256(SW)(M) |
| | c)Output: TAP := M \|\| TL.aHash |
| | 6. Derive Link Key |

Table 4 below shows a receive TAP message in accordance with the invention. In Table 4, the inputs comprise a Trust Accept Message from the receiver. The procedure produces as an output either a link key or an indication that the procedure has failed.

TABLE 4

Initiator: Receive TAP Message

| | |
|---|---|
| Inputs: | TAP := Trust Accept Message from receiver, includes: |
| | TAP.ID \|\| TAP.IB \|\| TAP.pubKeyB \|\| LK.ID \|\| TAP.aHash |
| Output: | Link Key or Fail |
| Procedure: | 1. If TL ephemeral parameters were stored in step <<XX>>, they may be loaded at this point. The TAP parameters are imported as follows: UnWrapKey-1(SW)(SEP.DK(TLK), TL.ID \|\| TL.privKeyA \|\| TL.eHash) |
| | 2. verify SHA-256(SW)(T.ID \|\| T.Info \|\| dhPubKey) == T.tag |
| | Set: TKArea.EstablishTrustMessageHash = T.tag |
| | 3. At this point, the SEP generates and secret shares a nonce associated with TM1.ID. Continuation of the protocol requires recovery of these values. This enforces recovery officer approval of the trust establishment process between the two parties. |

Table 5 below shows key derivation in accordance with the invention. In Table 5, the inputs comprise trustee link information for the initiator (TL.Info A) and for the receiver (TL.Info B). The procedure produces as an output a new link key.

TABLE 5

Key Derivation

| | |
|---|---|
| Inputs: | TL.InfoA, TL.InfoB, |
| Output: | New Link Key |
| Procedure | 1. Both parties derive a link key |
| | a)Compute ECC shared secret |
| | initiator: ECC-SS := EC-DH(SW)(TL.privKeyA, TL.pubKeyB) |
| | receiver: ECC-SS := EC-DH(SW)(TL.privKeyB, TL.pubKeyA) |
| | 2. Derive key |
| | linkKey := KDF2(SW)(ECC-DS, 64, TL.InfoA \|\| T.InfoB) |

Although the invention is described herein with reference to the preferred embodiment, one skilled in the art will readily appreciate that other applications may be substituted for those set forth herein without departing from the spirit and scope of the present invention. For example, any channel may be used as the offline channel as long it assures that the parties may be authenticated. Thus, a telephone call, email message, instant message, SMS or other text message, or any other suitable communication method, may be used as the offline channel. Further, while the invention is described in terms of each party establishing trust, such that trust is established in both directions, the invention allows a single party to become trusted if desired. Additionally, trust can be established for a limited purpose or duration. For example, the verifier may be produced by hashing a limited ID or by otherwise limiting the scope of trust.

Accordingly, the invention should only be limited by the Claims included below.

The invention claimed is:

1. An apparatus for establishment of a trust relationship between first and second security appliances which are communicatively connected over an insecure medium, comprising:

a module for generating a verifier code in the first security appliance in response to an input by a first user operatively connected to the first security appliance, wherein the first and second security appliances are configured to transparently encrypt data en route to one or more storage devices operatively connected to the first and second security appliances;

the first security appliance associated with the first user for generating a trust establishment package (TEP) and for forwarding the verifier code to a second user via the insecure medium in the TEP;

an offline channel over which the first user can communicate the TEP a second time to the second user in response to communicating the verifier code via the insecure medium;

the second security appliance associated with the second user configured to upload the TEP received from the first user via the insecure medium; and wherein the trust establishment package is authentic when the verifier code in the TEP received from the first user via the offline channel is the same as the verifier code received from the first user via the insecure medium, and wherein neither the first security appliance nor the second security appliance have to share all keys associated with the first and second security appliances to establish the trust relationship.

2. The apparatus of claim 1, wherein the trust relationship is established before sharing all the keys.

3. The apparatus of claim 1, wherein the second user confirms the verifier code to the first user via the offline channel.

4. The apparatus of claim 3, wherein the second user reads the verifier code from a display to the first user via a telephone call.

5. The apparatus of claim 1, wherein the trust establishment package comprises a hashed message.

6. The apparatus of claim 5, wherein the hashed message comprises a hash of any of a trust link establishment ID, the verifier code, and a public key.

7. The apparatus of claim 1, wherein the offline channel comprises any of a voice channel, an email channel, or a messaging channel.

8. The apparatus of claim 1, further comprising:

a second module of the second security appliance for generating a second verifier code;

the second module comprising a facility for generating a trust acceptance package, and for forwarding the second verifier code to the first user via the insecure medium in the trust acceptance package;

the offline channel for communicating the second verifier code to the first user;

the first module being associated with the first user for uploading the trust acceptance package received from the second user via the insecure medium, and for allowing the first user to enter the second verifier code received from the second user via the offline channel; and wherein the trust acceptance package is authentic when the second verifier code received from the second user via the offline channel confirms an identify of the second user's.

\* \* \* \* \*

UNITED STATES PATENT AND TRADEMARK OFFICE
CERTIFICATE OF CORRECTION

PATENT NO. : 7,971,234 B1  Page 1 of 1
APPLICATION NO. : 11/532468
DATED : June 28, 2011
INVENTOR(S) : Sussland et al.

It is certified that error appears in the above-identified patent and that said Letters Patent is hereby corrected as shown below:

In Col. 5, lines 16-17, should read:
Step 2. User 1 inputs info A into storage security ~~applian-~~
~~cel~~ appliance 1. Thus, the storage security appliance 1 generates a public/

Signed and Sealed this
Twenty-seventh Day of March, 2012

David J. Kappos
*Director of the United States Patent and Trademark Office*